United States Patent [19]

Rohr

[11] Patent Number: 4,708,312

[45] Date of Patent: Nov. 24, 1987

[54] EXTENSIBLE HEIGHT-ADJUSTABLE SWIVEL ARM FOR SUPPORTING A DISPLAY OR THE LIKE

[75] Inventor: Lorenz Rohr, Augsburg, Fed. Rep. of Germany

[73] Assignee: NCR Corporation, Dayton, Ohio

[21] Appl. No.: 918,174

[22] Filed: Oct. 10, 1986

[30] Foreign Application Priority Data

Oct. 23, 1985 [DE]  Fed. Rep. of Germany ....... 8530047

[51] Int. Cl.⁴ ................................................ E04G 3/00
[52] U.S. Cl. .................................. 248/280.1; 248/279; 248/283; 248/289.1; 248/293
[58] Field of Search ..................... 248/280.1, 282, 283, 248/293, 289.1, 585, 279, 106

[56] References Cited

U.S. PATENT DOCUMENTS

| | | | |
|---|---|---|---|
| 1,753,875 | 4/1930 | Baumann | 248/279 X |
| 2,994,501 | 8/1961 | Barnard | 248/279 X |
| 3,358,957 | 12/1967 | Lindenmuth | 248/279 |
| 3,929,309 | 12/1975 | De Vore | 248/279 X |
| 4,166,602 | 9/1979 | Nilsen et al. | 248/280.1 |
| 4,266,747 | 5/1981 | Sounder et al. | 248/280.1 |
| 4,548,373 | 10/1985 | Komura | 248/280.1 X |
| 4,548,374 | 10/1985 | Thompson et al. | 248/280.1 X |

Primary Examiner—Ramon O. Ramirez
Attorney, Agent, or Firm—Wilbert Hawk, Jr.; Casimer K. Salys

[57] ABSTRACT

A swivel arm structure suitable for supporting a video display apparatus or the like and for positioning such apparatus with substantial discretion and ease. A first, horizontally movable arm is pivotally attached to a fixedly mounted base, which movable arm can be articulated at multiple movement interrelated joints within the horizontal plane. A vertically translating parallelogram type linkage is attached at one end to the horizontally articulatable arm and at the other end supports the apparatus. In one form one linkage member is situated within the tubelike structure of the other linkage member. The swivel arm can be freely moved, without angle induced binding of hinges, to position the apparatus.

7 Claims, 9 Drawing Figures

EXTENSIBLE HEIGHT-ADJUSTABLE SWIVEL ARM FOR SUPPORTING A DISPLAY OR THE LIKE

BRIEF SUMMARY

The invention relates to an extensible height-adjustable swivel arm for supporting a video display or other apparatus at various, selectable positions with relation to an attached base location.

Conventional swivel arms provide continuous height adjustment by means of a pair of links, which form a parallelogram, supported by a spring element. One end of the pair of links is directly secured to a base using an attachment which allows the linkage members to move pivotally about a vertical axis at the base. At the opposite, free end, the vertical linkage member has an extending arm, which arm pivots about the vertical axis at the linkage member free end and supports at the far end of such arm the video display apparatus. The radius of action, i.e.. the extensibility, is achieved by translation of the parallel linkage member and rotating about the end members. Dependent on the position of extension and arm orientation significantly different torques act at the linkage member hinges.

The conventional parallelogram type arrangement exhibits a tendency to bind at the pivots or hinges of the linkage members when the supported apparatus is situated on an arm which is attached to the free end of the linkage and oriented at or near 90° to the plane of the linkage parallelogram. Under these conditions, the combination of the angles through which the forces act, with linkage member pivot axes friction, and spring element forces, cause a binding for attempted direct vertical movements of the apparatus, requiring the user of the swivel arm to supplement the vertically directed forces with horizontally directed forces to complete a vertical movement of the apparatus.

It is the object of the present invention to provide a swivel arm for supporting a video display apparatus or the like which facilitates the positioning of the supported apparatus in all directions with relative ease.

The present invention situates the free end of the vertically acting parallelogram configured arrangement directly beneath the apparatus, so that vertically directed forces, from the weight of the apparatus and the like, act in line with the vertical linkage of the parallelogram level arrangement. Horizontal translations of the apparatus are accomplished through a combination of rotation at the swivel arm base attachment and a horizontal plane translations of an articulated member pivotally attached thereto. The composite structure facilitates full three dimensional positioning of the apparatus from vertical or horizontal forces directly applied thereto.

Further features and advantages of the swivel arm structure according to the present invention may be gathered from the following description of an embodiment as illustrated in the drawings.

DETAILED DESCRIPTION

Figure 1:
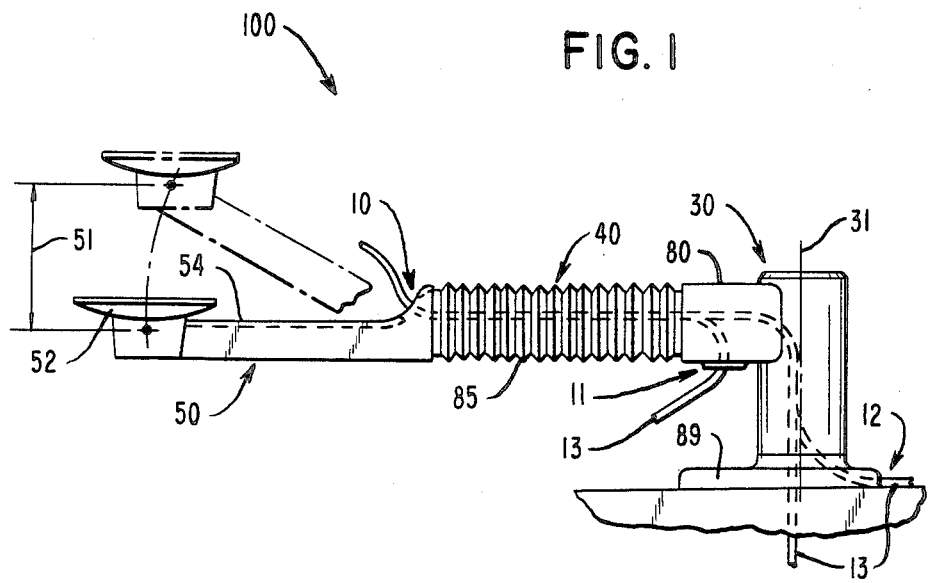
FIG. 1 is a schematic side view of a swivel arm according to the invention.
Figure 2:
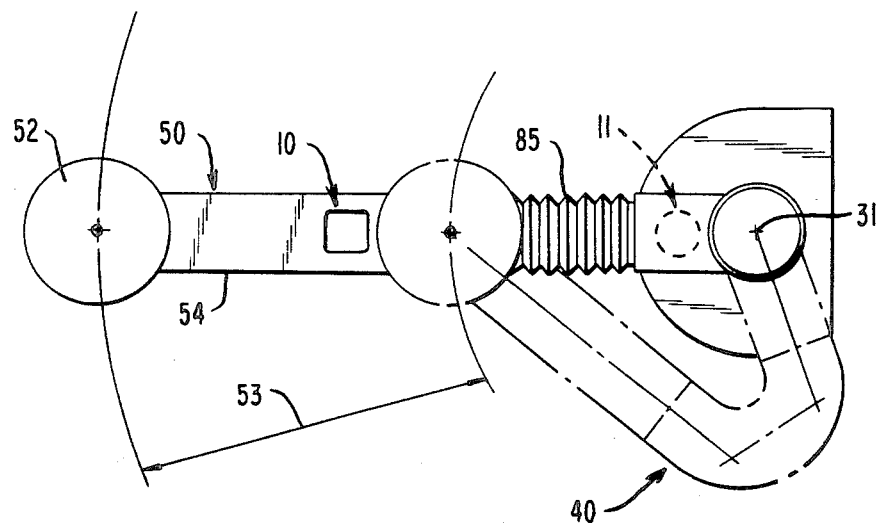
FIG. 2 is a top view of the swivel arm in FIG. 1.

FIGS. 1 and 2 illustrate the principle design elements and features of an embodying swivel arm 100 according to the invention, comprising a table attachment base 30, a horizontally translatable articulated section ,40 and a vertically translatable parallel lever arrangement section 50. As shown in FIG. 1, the vertically movable section 50 can be translated in the vertical plane to raise the height a distance 51, from the horizontal defined with reference to base 30. FIG. 2 illustrates that due to the particular design of the articulated horizontally translating section 40, described later, arm 100 can be swiveled about multiple vertical axes to extend or compress the swivel arm 100 in the full range of radial distance 53. Thereby, a video display apparatus 60 (FIG. 3) which is placed onto apparatus support 52 of the vertical movable section 50, may be spatially shifted and positioned over a wide range in three dimensions.

Figure 3:
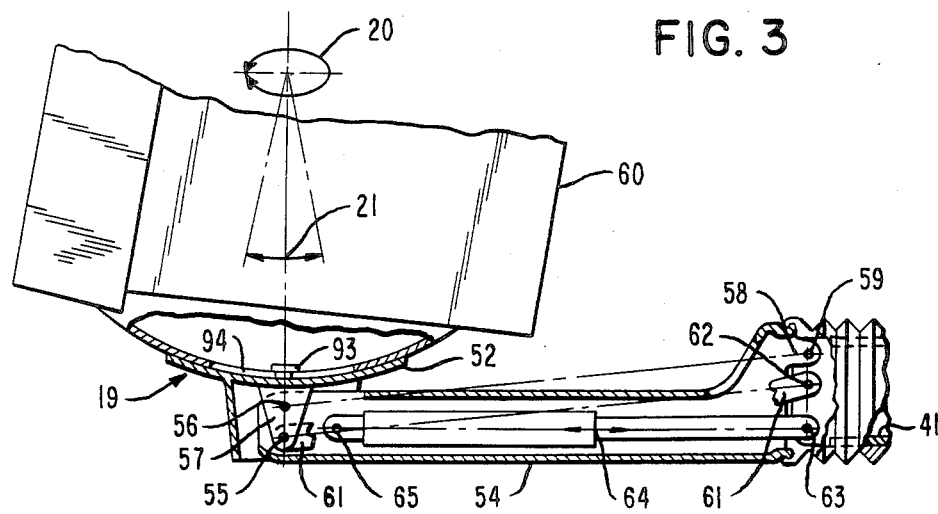
FIG. 3 is an cross-sectional view of the pair of levers in the vertically translatable member.

FIGS. 1 to 3 illustrate that the vertically movable section 50 is comprised of a tubelike arm 54, preferably having a rectangular cross section. The free end of the arm 54 has an open topside and houses a lever member projection 57, which projection is pivotally supported by means of shaft 56 horizontally extending between the two side walls of the arm 54.

The tubelike arm 54 forms a first lever, the other end of which is defined by two ears 58 through which extends a shaft 59 to secure the tubelike arm 54 to a transitional member 41 of the horizontally translatable articulated section 40. Thereby, arm 54 is movable in the vertical direction. The other lever 61, of the lever pair 54, 61 together forming a parallelogram, is also pivotally attached to the transitional member 41, by means of horizontal shaft 62. Preferably shafts 59 and 62 are aligned in the same vertical plane. The other end of lever 61 is pivotally attached in the free end of tubelike arm 54 to the projection 57 by means of shaft 55. It should be noted that the projection 57 is preferably formed as a U-like bracket with the shafts 55 and 56 extending between the legs thereof.

Figure 4:
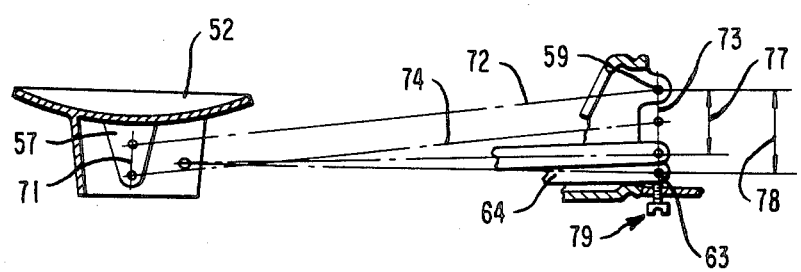
FIG. 4 is modified embodiment of the lever arrangement, providing spring adjustment capability.

Therefore, as shown in FIG. 4 in detail, there exists the parallelogram having sides 71, 72, 73 and 74. In this connection, it should be noted that these lines of action are independent of the form actually taken by the levers, where, for example, the side 72 is formed by the tubelike arm 54.

In FIG. 3, spring element 64, preferably a gas spring, is at the one end secured to the transitional member 41 by means of a shaft 63, and at its other end is secured to the arm 54 by means of a shaft 65 extending between the side walls of the tubelike arm 54. The spring element 64 is preferably adjustable, offering the possibility to locate the stud 63 at different positions. Exemplary FIG. 4 shows the possibility to adjust the stud 63 by means of a screw 79 between a minimum distance 77 and a maximum distance 78 from the shaft 59.

As generally known, such a spring biased parallelogram offers the possibility, with an appropriate selection of the spring force depending on the load at the free end, to adjust the position of the free end of the swivel arm by means of a relatively small force in upward or downward directions.

If the object to be supported, in particular the video display apparatus 60, differs in weight from a norm, the difference can be compensated for by adjusting the spring element 64 by means of the screw 79.

Figure 5:
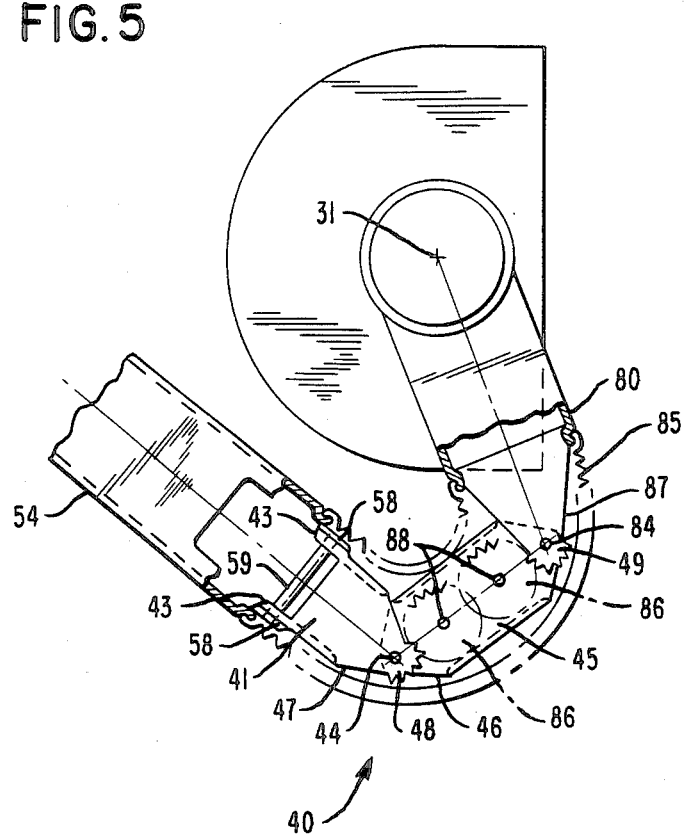
FIG. 5 is a top, partial cross section view of the swivel arm horizontally translating articulated member.

FIG. 5 shows in detail the horizontally translatable articulated section 40 of the swivel arm 100, which section provides the capability for considerable displacement of the video display apparatus 60 in the horizontal plane. FIG. 5 shows in detail that transitional member 41, already mentioned in connection with FIG. 3, is comprised of a rectangular frame having formed thereon ears 43 through which a shaft 59 extends for pivotally mounting thereto the tubelike arm 54 via its ears 58. In the horizontal plane the top and bottom walls of member 41 are formed to a tapered projection 47, the front end of which has gear teeth 48 in form of a partial gear wheel. In the center of the partial gear wheel 48 a second transitional member 45 of section 40 is secured by means of a vertical shaft 44 via tapered projections 46 of the top and bottom walls of member 45. Pivotally mounted by shafts 88 in member 45 are two gear wheels 86 meshing with each other. The gear wheels 86 also mesh with the partial gear wheel 48 and partial gear wheel 49, the latter formed on a projection 87. Projections 87 extend from rectangular frame member 80. Shaft 84 in the center of the partial gear wheel 49 pivotally secures transitional member 45 to projection 87. Given the described meshing of the teeth on gear wheels 86 and partial gear wheels 48 and 49, it becomes apparent that any rotation of aarm 54 in the horizontal plane, e.g., clockwise, results in an oppositely directed, thereby counter clockwise, rotation of rectangular frame member 80, and a proportional angular change with respect to second transitional member 45, to define the curvature of arm 40.

Figure 6:
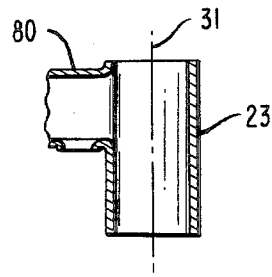
FIGS. 6–9 show various types of base attachments for the swivel arm according to the invention.
Figure 7:
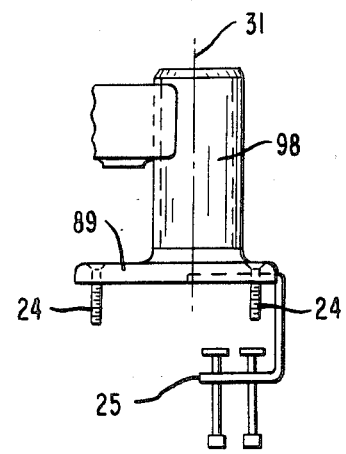

FIG. 6 illustrates how the frame member 80 is secured to a cylindrical tube 23 to rotate concentrically about the shaft center 31 (FIGS. 1, 2, and 5).

As shown in FIGS. 1, 2 and 5, the horizontally translatable articulated section 40 is adapted to move in a horizontal plane at pivot axes which are linked by gears to relate respective movements. Thereby section 40, when combined with the rotation about vertical axis 31, provides an extraordinarily broad range of two dimensional displacements while maintaining controlled radii of curvature in section 40. There are no Z-like bends created in section 40 notwithstanding the presence of three sections, 41, 45 and 80, and two axes, 44 and 84, of rotation. This feature permits the use of a single cover for the total horizontally movable section 40, such as flexible boot 85, which boot 85 is attached at one end to the tubelike arm 54 and its other end to the frame member 80.

Figure 8:
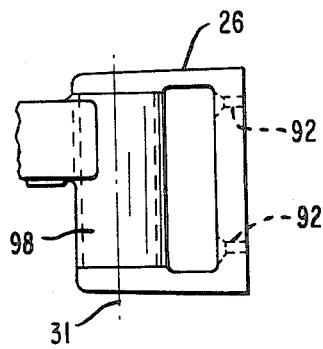
Figure 9:
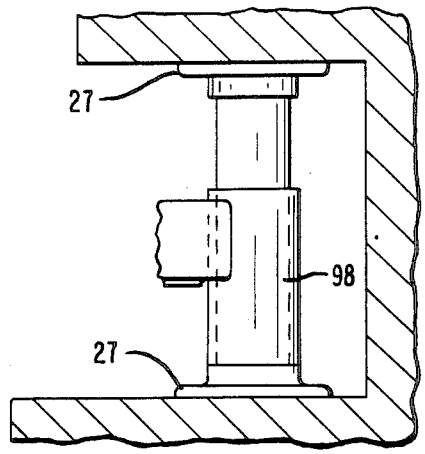

FIGS. 6-9 show possible configurations for attaching the frame 80 of the swivel arm 100 via the cylindrical tube 23 to be rotatable about the vertical axis 31 of a supporting column 98. For example, the vertically oriented column 98 in FIG. 7 can be attached to a base 89 which is itself secured to a table by screws 24 or by a clamp 25. FIG. 8 shows a wall attachment, where a bracket 26 supports vertical column 98. The bracket 26 may be secured to the wall by means of screws passing holes 92. FIG. 9 shows an attachment of the column 98 in which bases 27 clamp column 98 from below and above.

A further essential advantage of the swivel arm 100 according to the invention is that the cables 13 shown in FIG. 1 used by video display apparatus 60 (FIG. 3) can be entered into the swivel arm 100 from below, either by passing directly through the base 89 via opening 12, or through an opening such as 11 in the frame member 80 (FIG. 5), or directly up through the cylindrical tube 23 (FIG. 6). The cables can then pass through the horizontally translatable section 40 to the display apparatus 60 (FIG. 3) through an opening 10.

FIG. 3 illustrates that the structure according to the present invention embodiment provides the capability to tilt the video display apparatus 60 about a horizontal axis through an angle 21 by means of a spherical support 19, and to rotate the display apparatus about a vertical axis through a full circle 20. For example, spherical support 19 can include a stud 93, which is attached to projection 57, extends through a slot 94, and is retained in the slot 94 by the enlarged stud head.

Though the horizontally translatable articulated section 40 in the present embodiment has a transitional member with gears, a different arrangement, employing levers or the like, could also be implemented if desired. However, the gear design does result in a structure which exhibits a particularly smooth bending action of the swivel arm 100.

The disclosed swivel arm 100 does not exhibit binding during adjustments of the video display apparatus position because the forces which act upon the vertically movable parallelogram arrangement act directly at the pivotal points of the parallel lever arrangement irrespective of the horizontally translated position of the apparatus with reference to its base attachment.

I claim:

1. A swivel arm structure, comprising:
    a base for fixedly supporting the structure;
    an articulated member of three elements, the first element rotatable at its first end about the vertical axis of the base, a second element attached at its first end to a second end of the first element and rotatable about the vertical axis at such attachment, and a third element attached at its first end to a second end of the second element and rotatable about the vertical axis at such attachment;
    a parallel lever arrangement translatable in the vertical plane, attached at one end to the second end of the third element; and
    an apparatus support attached to the second, oppositely disposed end of the parallel lever arrangement.

2. The structure recited in claim 1, wherein the parallel lever arrangement is comprised of a first tubelike lever and a second lever arranged therein.

3. The structure recited in claim 2, further including a spring element arranged within the first lever connected to act on the articulated member and the apparatus support.

4. The structure recited in claim 1, wherein the second element includes a gear arrangement for relating horizontal plane movement between the first and third elements.

5. The structure recited in claim 2, wherein the second element includes a gear arrangement for relating horizontal plane movement between the first and third elements.

6. The structure recited in claim 4, wherein the gear arrangement includes a pair of meshing gears in the second element which further individually mesh gear teeth on the first and third elements.

7. The structure recited in claim 5, wherein the gear arrangement includes a pair of meshing gears in the second element which further individually mesh gear teeth on the first and third elements.

* * * * *